Sept. 6, 1932. J. MADLEHNER 1,876,310
UNDERFEED FIRE POT
Filed April 13, 1929
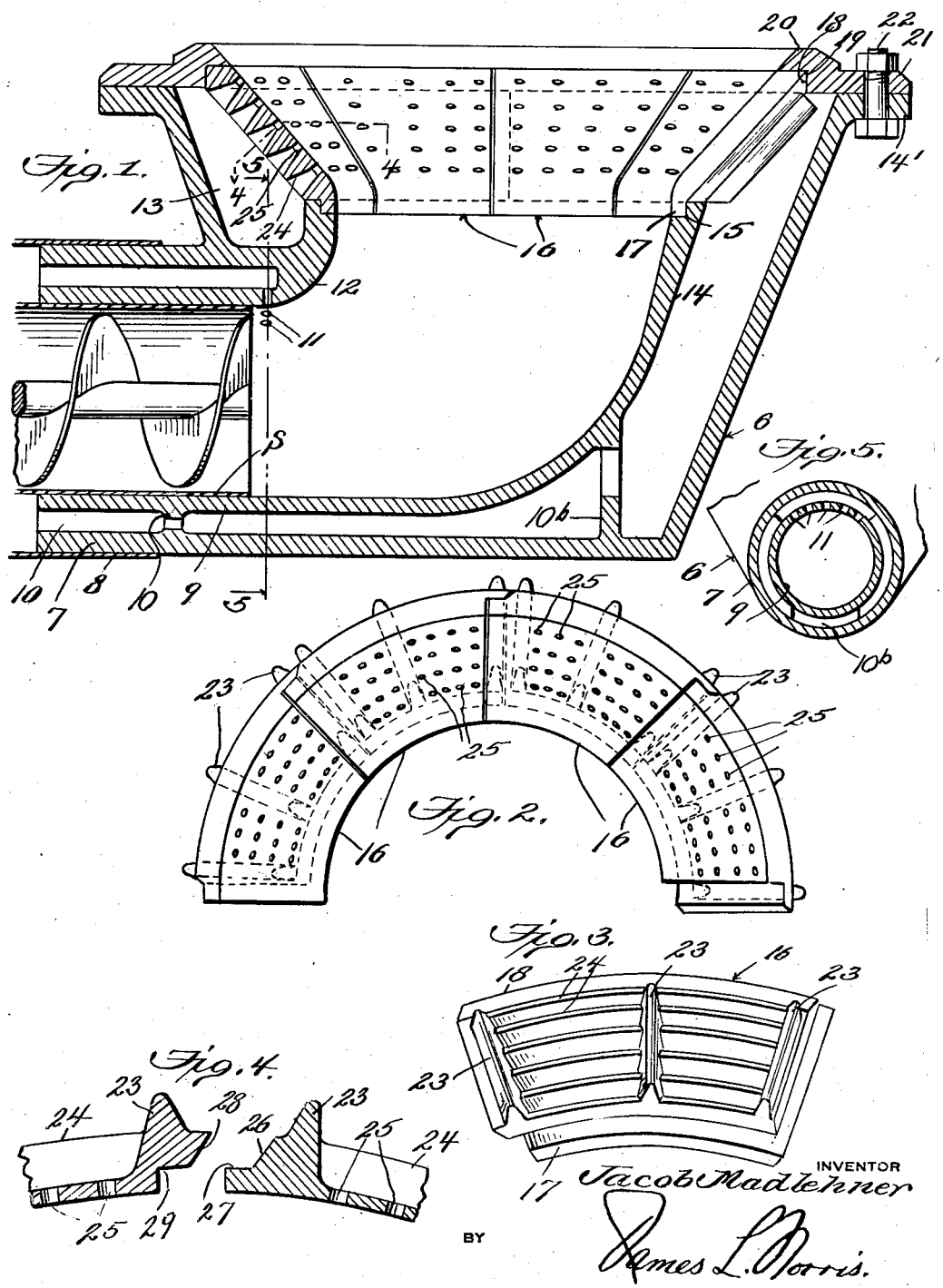

Patented Sept. 6, 1932

1,876,310

UNITED STATES PATENT OFFICE

JACOB MADLEHNER, OF ERIE, PENNSYLVANIA

UNDERFEED FIRE POT

Application filed April 13, 1929. Serial No. 354,956.

The present invention relates to improvements in an underfeed fire pot and relates particularly to the detail construction of the fire pot used in my copending application filed April 13, 1929, Serial No. 354,957 one object of the invention being the provision of a fire pot in which the air feed or grate portion is made up of interlocking sections and held in place by a retaining ring and the base portion of the pot in a desired flared and clamped position so that the sections may be easily renewed when necessary.

Another object of the present invention is the provision of means by which air is supplied to the combustible material in the fire pot but is prevented from causing a backfire in the fuel delivery chute or conveyer.

In the accompanying drawing:—

Fig. 1 is a longitudinal sectional view of the complete fire pot;

Fig. 2 is a top plan view of a portion of the grate or air supplying portion thereof;

Fig. 3 is a perspective view of one of the sections of the grate;

Fig. 4 is a section taken on the line 4—4 of Fig. 1, showing the ends of a pair of sections separated; and Fig. 5 is a section taken on the line 5—5 of Fig. 1.

The numeral 6 designates generally a supporting member of substantially the shape of an inverted truncated cone and has a tubular extension 7 projecting rearwardly from its lower portion, upon the end of which the end of a pipe 8 is mounted.

A fire pot 14, mounted in the supporting member and spaced from the latter by apertured webs 10$^a$ and 10$^b$, has a cylindrical extension 9 projecting rearwardly from its lower portion into the tubular extension 7 of the supporting member 6.

A fuel supply pipe S, through which fuel is delivered by a screw conveyor to the fire pot 14 and thence into the lower portion of the grate, extends into the end of the cylindrical extension 9.

The supporting member 6 extends above the upper end of the fire pot 14 and the upper end of the fire port 14 is shouldered, as at 15, to engage complemental shoulders 17 formed on the lower edges of the grate sections 16. The grate sections 16 extend from the upper end of the fire pot 14 to just above the upper end of the supporting member 6.

Air for supporting combustion in the grate is supplied by a blower (not shown) through the space between the pipes 8 and S and through the space 10 between the extensions 7 and 9 to the space 13 between the grate and the supporting member 6 and thence through the ribs 24 and perforations 25 to the interior of the grate.

A row of radial openings 11 is formed in the cylindrical extension 9 of the fire pot 14 immediately behind the upper bend 12 between the fire pot 14 and the cylindrical extension 9 of the latter. Air issuing from the space 10 through said openings will mix with any gas formed in the fire pot 14 below the grate and deliver such gas to the lower end of the grate. Thus such gas as may be formed in the fuel as it is delivered to the fire pot will be prevented from passing back into and through the fuel delivery pipe S and the possibility of such gas exploding in the fuel delivery pipe and setting fire to the fuel in the latter will be avoided.

The upper edge of each grate section 16 is shaped, as at 18, to fit into a shoulder 19 formed on the under side of an annulus 20 whose inner circumference coincides with the inner face of the grate. This annulus is provided with an apertured rim engaging portion 21 which rests upon the rim 14' of the outer casing 6 and is secured thereto by bolts 22, one only being shown in the present instance. Thus the annulus 20 acts as a clamping ring to hold the grate sections 16 in place without the necessity of other bolts or fastenings to attach the sections to the member 14.

Each grate section 16, as clearly illustrated in Figs. 3 and 4, is provided with a plurality of external transverse reinforcing ribs 23 and longitudinal reinforcing ribs 24. A plurality of longitudinal grooves are also formed in the outer surface of each grate section and a plurality of apertures 25 extend from the bottoms of such grooves through the grate sections through which air passes from the space 13 to the grate.

Each grate section 16 is provided, as best shown in Figure 4, with an angular portion 26 and projection 27 at one end and an inclined portion 28 and recess 29 at the opposite end, the angular portion 26 and projection 27 being complemental to the inclined portion and recess 29 so that the sections, when placed in position, interlock circumferentially and are held together by the annulus 20.

From the foregoing description it is evident that after removal of the bolts 22 and the annulus 20 any of the grate sections that are warped or burned out may be readily renewed thus providing a very simple means of repair.

It is also apparent that, by reason of the outlets 11, the gases of combustion are directed upwardly into the combustion zone and are prevented from entering the fuel as it is fed by the conveyer into the lower end of the fire pot, thus overcoming a fault that is present in most underfeed burners and making the present burner exceedingly safe and practical.

I claim as my invention:—

1. An apparatus of the character described, comprising a casing having its upper end open and surrounded by a flange, said casing having a tubular extension projecting rearwardly from its lower portion, a fire pot mounted in said casing and spaced therefrom, said fire pot having its upper end open and disposed below the upper end of said casing, said fire pot also having a cylindrical extension projecting rearwardly from its lower portion into and spaced from the extension of said casing, a grate of substantially inverted truncated cone shape mounted in the upper open end of said casing and having its lower end supported by the open upper end of said fire pot, and an annulus mounted on the flanged upper end of said casing and having a recess in its under side in which the upper end of said grate is seated.

2. An apparatus of the character described, comprising a casing open at its upper end and having a tubular extension projecting rearwardly from its lower portion, a fire pot mounted in said casing and spaced therefrom with its upper end open and disposed below the upper end of said casing, said fire pot having a cylindrical extension projecting rearwardly from its lower portion into and spaced from the extension of said casing, a grate of substantially inverted truncated cone shape mounted in the upper end of said casing and provided with perforations in its wall, said grate having its lower end resting on the upper end of said fire pot, the extension of said fire pot having apertures in its wall rearwardly of the fire pot body for the admission of air from the space between said tubular extensions to the fire pot below the lower end of the grate.

3. An apparatus of the character described, comprising a casing having its upper end open and having a tubular extension projecting rearwardly from its lower portion, a fire pot mounted in said casing and spaced therefrom with its upper end open and disposed below the upper end of said casing, said fire pot having a cylindrical extension projecting rearwardly from its lower portion into and spaced from the extension of said casing, a grate in said casing comprising a plurality of sections of which the lateral edges have portions complemental to and inter-fitting with the lateral edges of the adjacent sections and the upper and lower edges of said sections being supported respectively by the upper ends of said casing and fire pot but unattached thereto.

In testimony whereof I have hereunto set my hand.

JACOB MADLEHNER.